B. THOENS.
METHOD OF REFRIGERATION.
APPLICATION FILED MAY 28, 1919.
1,369,365.
Patented Feb. 22, 1921.
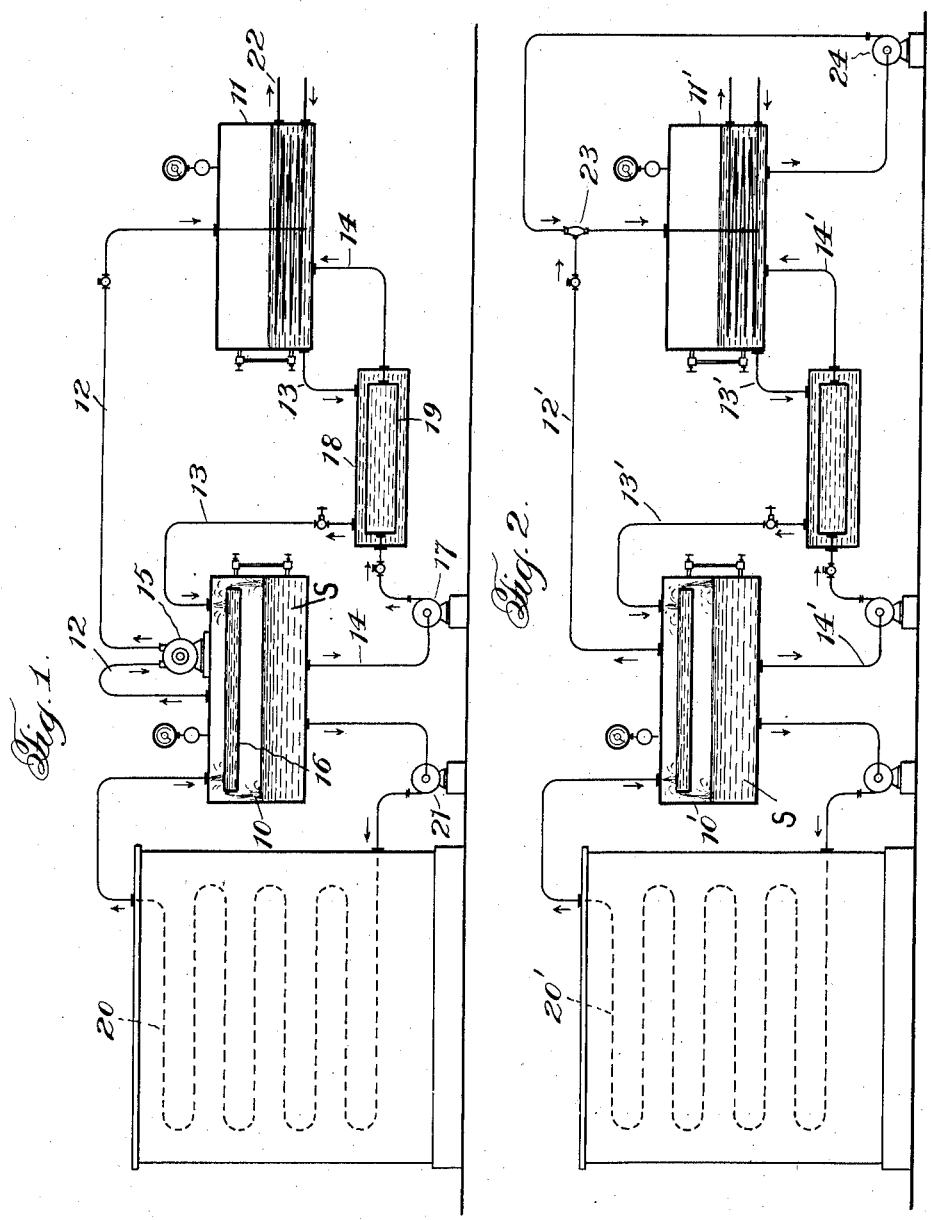
INVENTOR
Burchard Thoens
BY
Foster, Freeman, Watson & Cox
ATTORNEYS

UNITED STATES PATENT OFFICE.

BURCHARD THOENS, OF NEW YORK, N. Y.

METHOD OF REFRIGERATION.

1,369,365.   Specification of Letters Patent.   Patented Feb. 22, 1921.

Application filed May 28, 1919. Serial No. 300,307.

*To all whom it may concern:*

Be it known that I, BURCHARD THOENS, a citizen of the United States, and residing at New York city, New York county, New York State, have invented certain new and useful Improvements in Methods of Refrigeration, of which the following is a specification.

This invention relates to improvements in methods of refrigerating and has for its object to provide an improved method combining the advantages of the vacuum and absorption systems of refrigeration, at the same time avoiding the disadvantageous features of these systems.

In the vacuum system a tank is provided having a vacuum pump associated therewith for creating a vacuum therein above the surface of the refrigerant. The vaporization which takes place at the upper surface of the refrigerant, owing to the low pressure in the tank, cools the remainder of the refrigerant which is circulated through an external circuit including an ice box, refrigerator, or other similar cooling device. It has usually been found that in addition to the vacuum pump it is necessary to use an acid to absorb the vapors and remove them from the tank to insure rapid vaporization, and also to avoid the use of a very large vacuum pump.

In the absorption system a liquid is used as a refrigerant which is easily dissolved in water but which has a low vaporization temperature. A generator is provided which contains refrigerant in solution. Heat is applied to the generator to volatilize the refrigerant which passes into a condenser where it is liquefied and from the condenser the refrigerant flows through an expansion valve, being expanded from a liquid to a gas. In thus expanding, the refrigerant absorbs heat in a well known manner to cool the interior of an ice box, or to do similar work. After having passed through this external work circuit it flows into an absorber in which is located a considerable quantity of a weak solution of the refrigerant. The refrigerant passing into the absorber is dissolved in this weak solution making it stronger and pipes are provided connecting the generator with the absorber for transferring the stronger solution in the absorber to the generator, and the weaker solution in the generator to the absorber, for strengthening.

In my invention I make use of the principle of the vacuum system in that I cool a large body of refrigerant by creating a vacuum above it in a tank and causing it to vaporize and then circulate the cooled refrigerant through the external work circuit. Instead of using the ordinary refrigerant, such as water, which is ordinarily used in the vacuum system, I use a solution of ammonia or similar liquid, which is easily vaporized, and instead of conducting away and losing the vapors, as is done in the vacuum system, I provide an absorbing tank in which the vapors are absorbed and the strong solution created thereby returned to the vaporizing tank. The weak solution of the vaporizing tank is at the same time constantly transferred to the absorbing tank to come in contact with and absorb an additional amount of refrigerant. This process is continuous, provided there is no leakage, and the apparatus will run for a great length of time without attention.

In my improved method, which combines as above explained, the vacuum and the absorption systems, I avoid the use of acids peculiar to vacuum systems and avoid the use of the condenser and expansion valve, also the heat supplying mechanism of the absorption system. None of the various elements of my apparatus are subjected to high pressures such as exist in the absorption system in the generator, condenser, and piping between the generator and the expansion valve. There is, therefore, little tendency for the refrigerant to escape from the system. The danger of explosion is also avoided, as well as decomposition of the refrigerant itself.

The improved method will be fully disclosed in the following description when taken in connection with the accompanying drawings in which:

Figure 1 is a diagrammatic view of a refrigerating apparatus for practising the present invention;

Fig. 2 is a similar view of a modified form of the apparatus.

Referring to Fig. 1 of the drawings which illustrate a preferred form of apparatus for carrying out the invention, the reference numeral 10 indicates a vaporizing tank containing a body of refrigerant, such as ammonia in solution, as indicated at S, and the tank 11 is an absorbing tank which is about one-half full of the solution. Connecting the tanks 10 and 11 are three separate conduits or pipe lines indicated at 12, 13 and 14 in the drawings. The conduit 12 has one end communicating with the top of the tank 10 and its other end opening near the bottom of the tank 11, and this conduit includes at a point intermediate its ends a vacuum pump 15 preferably of the rotary type. The function of the pump 15 is to reduce the pressure and create a partial vacuum in the tank 10 above the surface of the solution, thereby causing part of the refrigerant to vaporize to cool the remainder thereof. Any water which may be vaporized will pass with the refrigerant vapors to the absorber and will be condensed in that vessel. No analyzers or rectifiers are necessary to overcome and eliminate the water vapors, such as are now commonly used in modern absorption systems. This is another point of superiority of the present system over the absorption systems heretofore used. The vapors drawn from the tank 10 are forced by the pump into the tank 11, emerging from the conduit 12 near the bottom thereof, where they are absorbed by the solution in this latter tank. Through the conduit 13 a warm, strong solution of the refrigerant is constantly being withdrawn from the tank 11 and transferred to the tank 10, the flow being caused by the difference in pressure existing in the two tanks. The inlet end of conduit 13 is located in a position to catch the strongest solution in the tank 11 and the outlet end is located at the top of the tank 10 over a baffle plate 16 so that the strong solution entering this tank is instantly subjected to the reduced pressure, thus immediately starting vaporization. The inlet of conduit 14 is at the bottom of the tank 10 and its outlet at the bottom of tank 11, and through this conduit is constantly passing a cool, weak solution of the refrigerant. Inasmuch as the solution passing through the conduit 14 is passing from a region of low pressure to a region of higher pressure, a pump is necessary, such as a rotary pump, which is indicated at 17 in the drawing.

It will be understood that the term "strong" and "weak" as applied to the strength of the solution at different points in the system, are relative only inasmuch as the solution used may be of any desired strength. For ordinary purposes it is desirable to use a comparatively strong solution inasmuch as the refrigerant, as ammonia, will not readily vaporize from a weak solution, except when a high vacuum has been created above its surface, which requires a large capacity vacuum pump or exhauster. While the use of a strong solution may increase the pressure in the absorber to some extent, this will not interfere with the efficient operation of the machine, the temperature of the refrigerator not being affected, and only a slight increase in the amount of power supplied to the pump 17 being necessary.

The conduit 13 includes a tank 18 surrounding on all sides a smaller tank 19 which is included in the conduit 14. These tanks are liquid tight so that the liquids passing through the respective conduits cannot intermingle and the purpose of this arrangement is to bring the two liquid currents into as close relation as possible without mixing them. It is desirable that the strong or rich solution entering the vaporizing tank should be as cold as possible, while the comparatively weak solution passing to the absorbing tank may be quite warm and by means of the arrangement illustrated the heat of the fluid passing through one conduit is largely given off by conduction to the liquid flowing in the opposite direction. This portion of the apparatus is known as the heat exchanger.

A fourth conduit 20 has its inlet in the bottom of the tank 10 and its outlet in the top of this tank, the intermediate portion being disposed conveniently in some ice box, refrigerator, or cold room, of any description. A pump 21 is included in this circuit and its function is to constantly cause a positive circulation of the cold solution from the vaporizing tank 10 through the external or work circuit. To aid the absorber to rapidly absorb vapors entering through the conduit 12, it is provided with a coil 22 through which cooling water is constantly circulated.

If the refrigerant consists of a solution of ammonia gas in water, for every pound of ammonia gas withdrawn from the solution in the tank 10 about 825 B. T. U. are extracted from the solution, and when a pound of ammonia gas is absorbed in the solution in the tank 11 the 825 B. T. U. are liberated and the system therefore constantly transfers heat from the work circuit 20 to the absorbing tank 11, from which it is removed partly by radiation and partly by conduction to a stream of cold water passing through the coil 22.

In some instances the vacuum pump illustrated in Fig. 1 may be dispensed with. When the solution is of sufficient strength an ejector may be substituted as shown in Fig. 2. The ejector 23 is aided in creating a vacuum in the tank 10' by the well known tendency of ammonia gas to pass instantly into a solution when brought in contact with water and thereby greatly assisting the aspirating action of the ejector. This decreases therefore the rapidity of flow and the quantity of the liquid necessarily passing through the ejector for creating the vacuum. Solution drawn from the bottom of tank 11' is forced by the rotary pump 24 through the ejector and back into the tank, thereby absorbing and entraining or aspirating the vapors passing through the pump or conduit 12′ and creating a partial vacuum in the tank 10′.

The method described may be utilized efficiently and satisfactorily in plants of large size, but is particularly useful in small domestic units, inasmuch as heat is not required, and only one or more motor driven pumps required together with a cooling coil by-passed from the house water supply. In addition, the numerous safety devices such as automatic high pressure cut-off switches, and switches responsive to the pressure of cooling water in the coils, together with the complicated and expensive wiring and switchboards necessitated thereby, are not required. Failure of the current supply to the motors or of water supply to the absorber will not bring about a dangerous condition in the system.

The method of refrigeration described may be varied within the limits indicated by the appended claims.

Having thus described the invention what is claimed as new and desired to be secured by Letters Patent is:

1. A method of refrigeration consisting in cooling a solution containing a volatile fluid contained in a closed vessel by removing the vapor of said volatile fluid from above the surface of the solution and discharging said vapor into an absorber, circulating part of the cooled solution through a refrigerator and back into the closed vessel, circulating a part of the cooled solution through an exchanger, an absorber, and through an exchanger back into the closed vessel, and cooling the absorber.

2. A method of refrigeration consisting in cooling a solution of a volatile fluid in a closed vessel by removing the vapors of said fluid from above the surface of the solution and discharging said vapors into an absorber, absorbing the vapor removed in a part of the cooled solution, and using another part of the cooled solution for refrigerating purposes.

3. A method of refrigeration consisting in cooling a solution of a volatile fluid in a closed vessel by removing the vapor of said volatile fluid from above the surface of the solution and discharging it into an absorber, absorbing the removed vapor in a part of the cooled solution and returning it through an exchanger to a closed vessel and using another part of the cooled solution for refrigerating purposes.

In testimony whereof I affix my signature.

BURCHARD THOENS.